United States Patent
Ishikawa et al.

(10) Patent No.: US 6,327,433 B1
(45) Date of Patent: *Dec. 4, 2001

(54) IMAGE BLUR CORRECTION APPARATUS

(75) Inventors: Masanori Ishikawa, Tokyo; Takashi Watanabe, Fuchu; Mitsuru Shinohara, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 36 days.

(21) Appl. No.: 09/342,221

(22) Filed: Jun. 29, 1999

(30) Foreign Application Priority Data

Jun. 30, 1998 (JP) ................................. 10-198116

(51) Int. Cl.⁷ .................................................. G03B 17/00
(52) U.S. Cl. ............................................................. 396/55
(58) Field of Search ........................ 396/55, 52; 359/555, 359/556, 557, 554; 348/208

(56) References Cited

U.S. PATENT DOCUMENTS

| 4,853,734 | 8/1989 | Tokura et al. ........................ 354/485 |
| 4,963,905 | 10/1990 | Haraguchi et al. ................... 354/152 |
| 5,537,174 | 7/1996 | Ishikawa .......................... 354/195.12 |
| 5,724,194 | 3/1998 | Ishikawa ............................... 359/696 |
| 5,937,212 | 8/1999 | Kurahashi et al. ..................... 396/20 |
| 5,974,269 | 10/1999 | Sato et al. ............................... 396/55 |
| 5,995,762 | * 11/1999 | Enomoto et al. ....................... 396/55 |
| 6,011,927 | * 1/2000 | Kamata .................................. 396/55 |

* cited by examiner

*Primary Examiner*—W. B. Perkey
(74) *Attorney, Agent, or Firm*—Fitzpatrick, Cella, Harper & Scinto (57) ABSTRACT

An image blur correction apparatus in which, even when a driving amount of a moving member is large, deterioration of driving efficiency is minimized without enlarging a driving device comprises a driving device having driving means comprising a flat coil and magnets arranged opposite the coil to drive a moving member by supplying electricity to the coil, the the coil is integrally constituted with the moving member. A relationship of a width of a driving direction of the coil and a width of the opposite magnet is set so that the width of the magnet is set greater than the width of the coil, and smaller than a length obtained by adding a maximum driving amount of the moving member to the width of the coil.

26 Claims, 9 Drawing Sheets

IMAGE BLUR CORRECTION APPARATUS

BACKGROUND OF THE INVENTION

1. Field of the Invention

The present invention relates to an improvement in a driving apparatus for driving a moving member, a correction optical apparatus having a correction optical system, or an image blur correction apparatus having the correction optical apparatus.

2. Related Background Art

For an existing camera, since exposure determination, focusing and other operations important for photographing are all automated, even a person unskilled in camera operation has a very little possibility of causing a photographing failure.

Moreover, a system for correcting image blur caused by manual vibration applied to the camera has been recently researched, and factors for inducing photographer's photographing failure have almost been eliminated.

Here, a system for correcting image blur caused by manual vibration will briefly be described.

The manual vibration of the camera during photographing is a vibration having a frequency normally in the range of 1 Hz to 12 Hz. In order to enable a photo with no image blur to be taken even if such manual vibration occurs at the time of releasing a shutter, as a basic idea, camera vibration caused by the manual vibration is detected, and a correction lens has to be displaced in accordance with the detected value. Therefore, in order to enable photos to be taken in such a manner that no image blur occurs even if manual vibration occurs, first, the camera vibration needs to be exactly detected, and secondly, an optical axis change caused by the camera vibration needs to be corrected by displacing the correction lens.

The vibration (camera vibration) can be detected, in principle, by mounting, on the camera, a vibration detection apparatus comprising a vibration detector for detecting acceleration, speed and the like and a calculation portion for electrically or mechanically integrating output signals of the vibration detector to output displacement. Subsequently, by controlling a correction optical apparatus in an image blur correction apparatus mounted to displace a correction optical system based on the detected information and to change a photographing optical axis, image blur correction can be realized.

As a conventional example of driving means of the correction optical system, a driving portion is used in which a coil and a magnet opposed thereto are used, the magnet is disposed on a fixed portion, the coil is disposed on the correction optical system, and an electric current is supplied to the coil for driving. A vertical vibration direction when a camera is set up in a positive position (hereinafter referred to as the pitch direction) and a transverse vibration direction orthogonal to the pitch direction (hereinafter referred to as the yaw direction) are detected, two pairs of the driving portions are correspondingly arranged to correct vibrations in the pitch and yaw directions, and the two directions are driven independently of each other. Such driving means is proposed.

Figure 9:
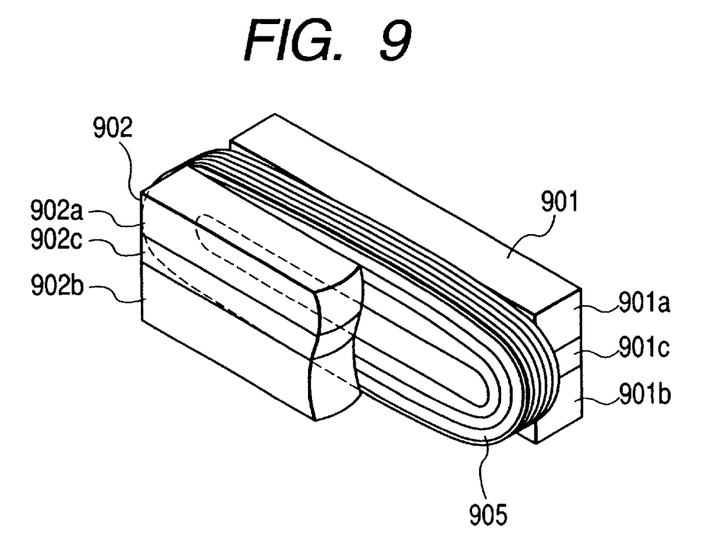
FIG. 9 is a perspective view showing a relationship of a coil and magnets forming driving means for driving a conventional correction optical system.
Figure 10A:
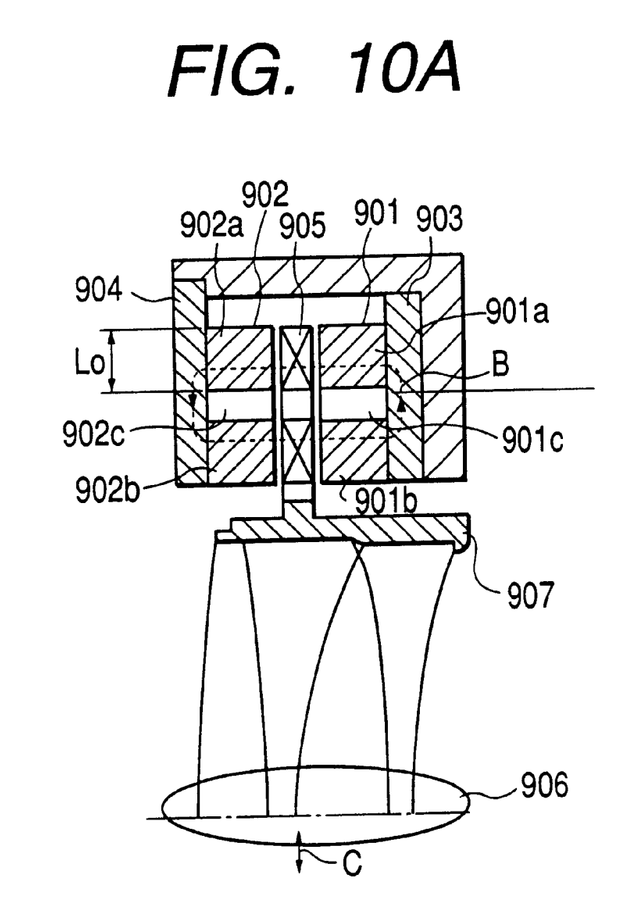
FIGS. 10A and 10B are sectional views showing a structure of the coil and magnets constituting the conventional driving means.
Figure 10B:
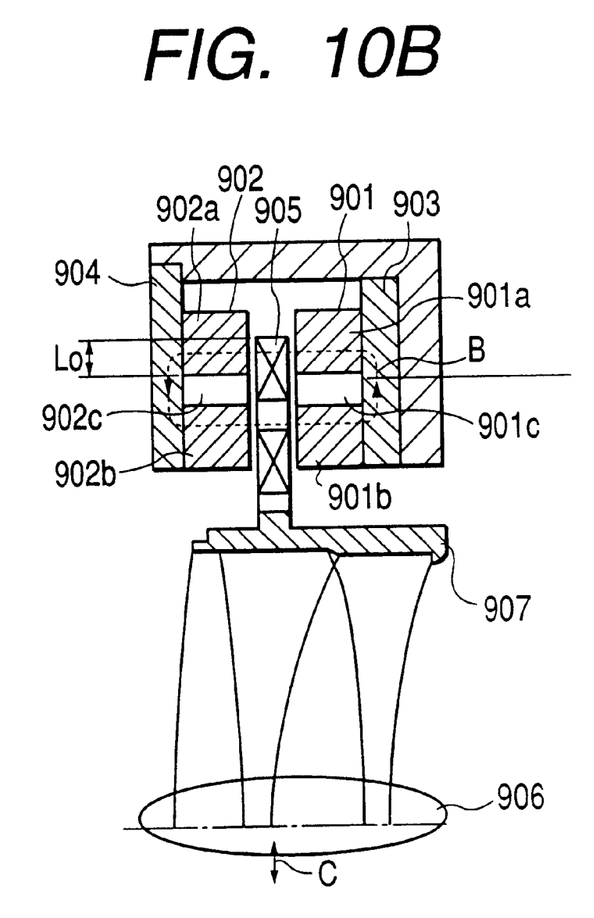

FIG. 9 is a perspective view showing a coil and magnets in an example of a conventional driving means, and FIGS. 10A and 10B are schematic views showing the relationship of the magnets and coil constituting the conventional driving means.

In the drawings, a first magnet 901 is polarized at 901a and 901b, has a central non-magnetized neutral area 901c, and is fixed to a base plate (not shown). In the same manner as the first magnet 901, a second magnet 902 is polarized at 902a, 902b, has a central non-magnetized neutral area 902c, and is fixed to a base plate (not shown). The first, second magnets 901 and 902 are attached to first, second yokes 903 and 904, respectively, to constitute a closed magnetic circuit having a flow of magnetic flux as shown by an arrow B. A flat coil 905 disposed between the opposed first and second magnets 901, 902 is integrally attached to a support frame 907 for supporting a correction optical system 906, and driven in a direction shown by an arrow C by supplied electricity.

Additionally, FIG. 10A shows that the correction optical system 906 is positioned in a driving center, and FIG. 10B shows that the correction optical system 906 is driven by a maximum driving amount in the direction of the arrow C, and positioned in a driving end. Furthermore, a thrust applied to the coil 905 is a product of a magnetic flux density passed through the coil 905, a current supplied to the coil 905 and an effective length of the coil through which the magnetic flux passes. Moreover, the effective length of the coil 905 through which the magnetic flux passes is proportional to a width $L_0$ in which the coil is opposed to the magnets (of a driving direction of the coil constituted integrally with the correction optical system). Therefore, when a magnetic flux leakage in the closed magnetic circuit is ignored, the thrust applied to the coil is substantially proportional to the width $L_0$ of the coil opposed to the magnets.

SUMMARY OF THE INVENTION

According to one aspect of the invention there is provided an image blur correction apparatus comprising a movable portion for moving to correct an image blur and a driving device for operating the movable portion. The driving device comprises a coil integrally provided on the movable portion, and a magnet disposed opposite at the coil.

For a relationship of a width of a driving direction of the coil and a width of the opposite magnet, the width of the magnet is set larger than the width of the coil, and smaller than a length obtained by adding to the width of the coil a movement length of the coil corresponding to a maximum driving length of the movable portion.

DETAILED DESCRIPTION OF THE PREFERRED EMBODIMENTS

The present invention will be described below in detail based on shown embodiments.

Figure 8:
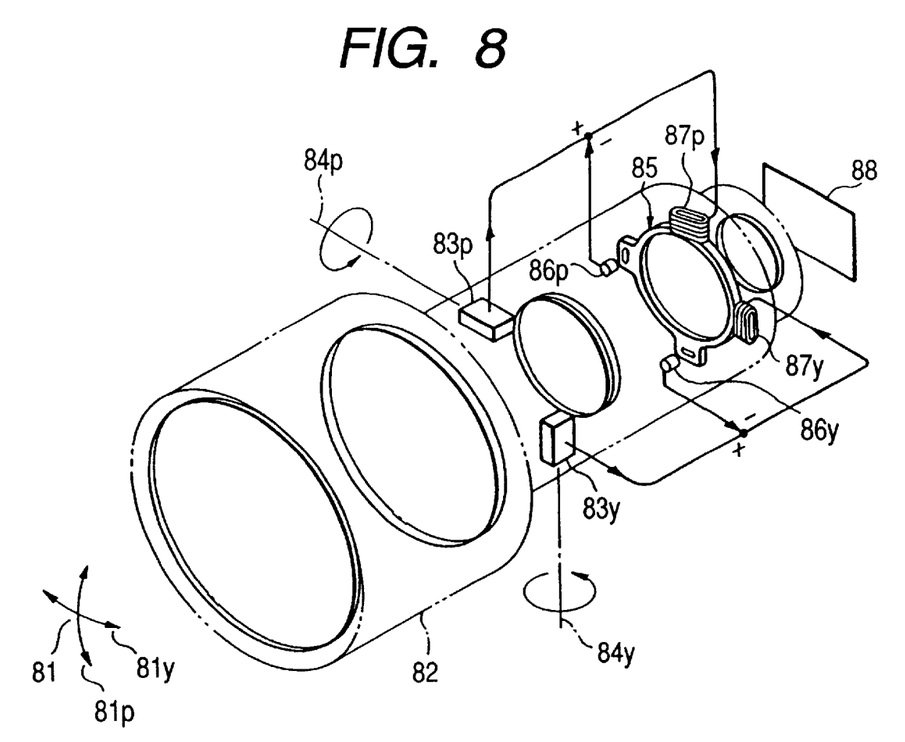
FIG. 8 is a perspective view diagrammatically showing a constitution of a system for performing a general image blur correction.

FIG. 8 shows a system for correcting image blur caused by a manual vibration, in which image blur of a direction shown by an arrow 81 resulting from a camera vertical vibration 81p and transverse vibration 81y is corrected.

In the drawing, numeral 82 denotes a lens mirror cylinder, 83p, 83y denote vibration detectors for detecting a camera vertical vibration (pitch direction) and a camera transverse vibration (yaw direction), and vibration detected directions are shown with 84p, 84y. A correction optical system 85 comprises coils 87p, 87y each for imparting a thrust to the correction optical system 85, and position detection means 86p, 86y for detecting a position of the correction optical system 85. The correction optical system 85 is driven using outputs of the detectors 83p, 83y as target values, to ensure stability on an image surface 88.

Figure 1:
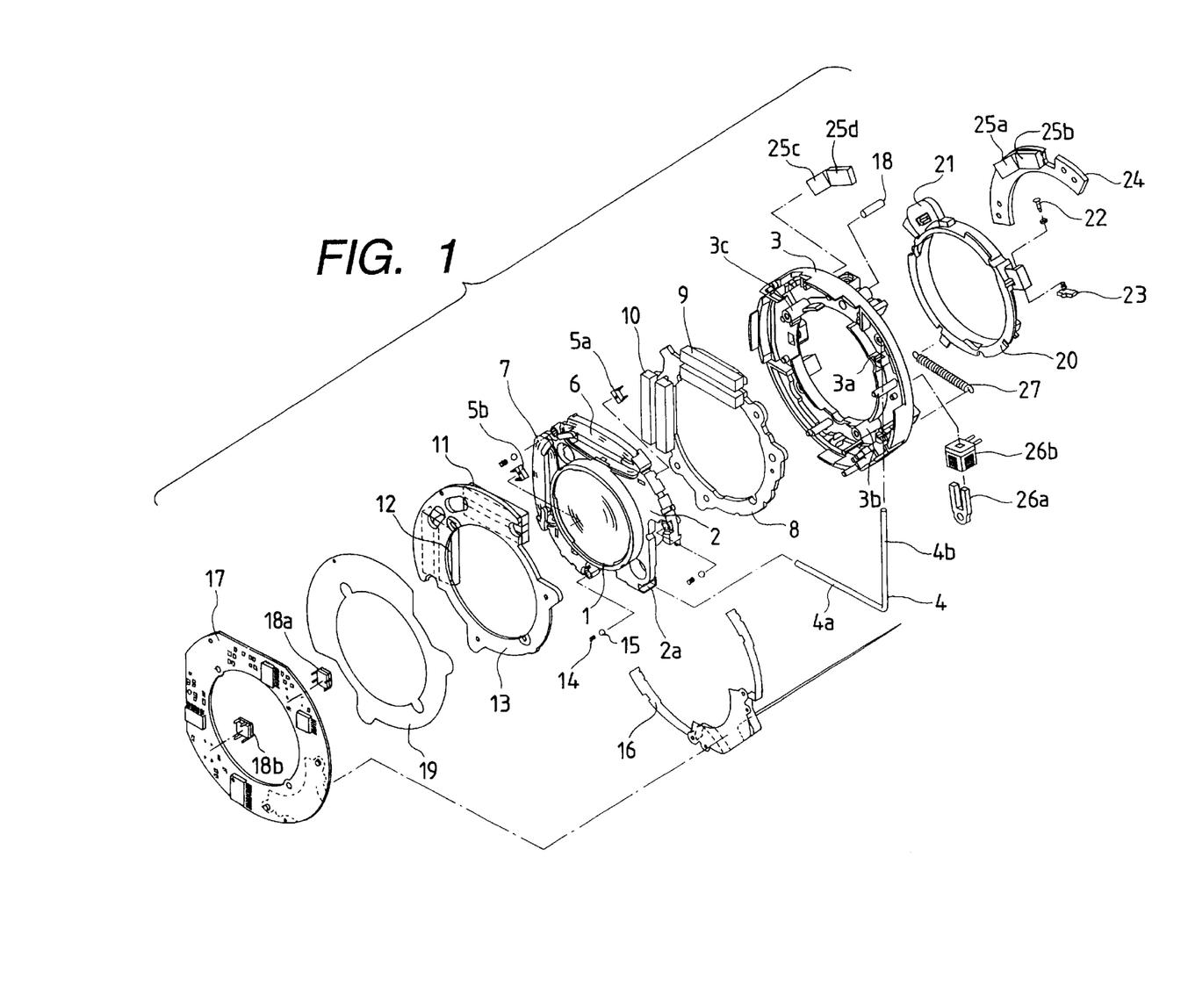
FIG. 1 is an exploded perspective view showing main components of a correction optical apparatus according to one embodiment of the present invention.
Figure 2A:
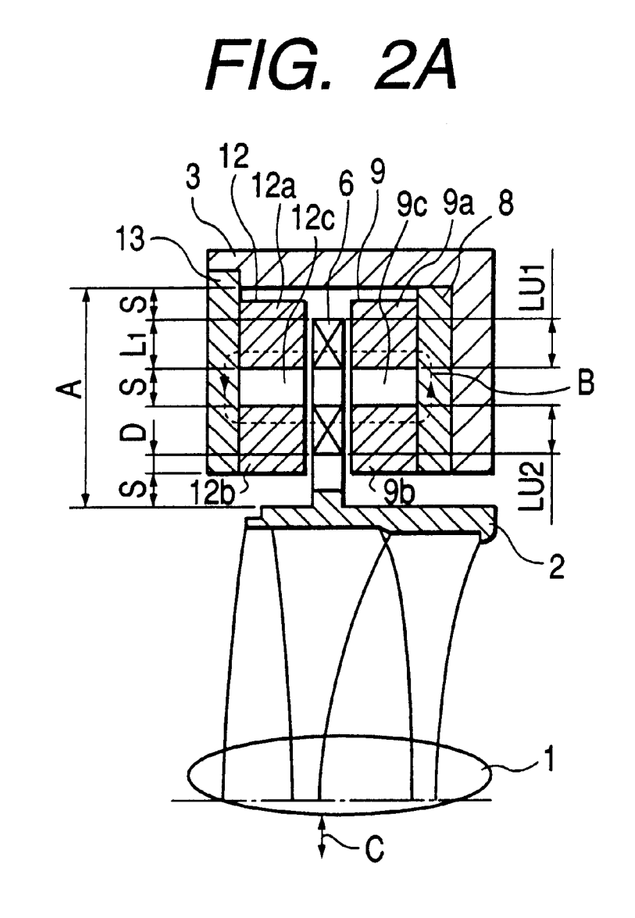
FIGS. 2A and 2B are sectional views for describing a structure of a coil and magnets forming driving means according to the embodiment of the present invention.
Figure 2B:
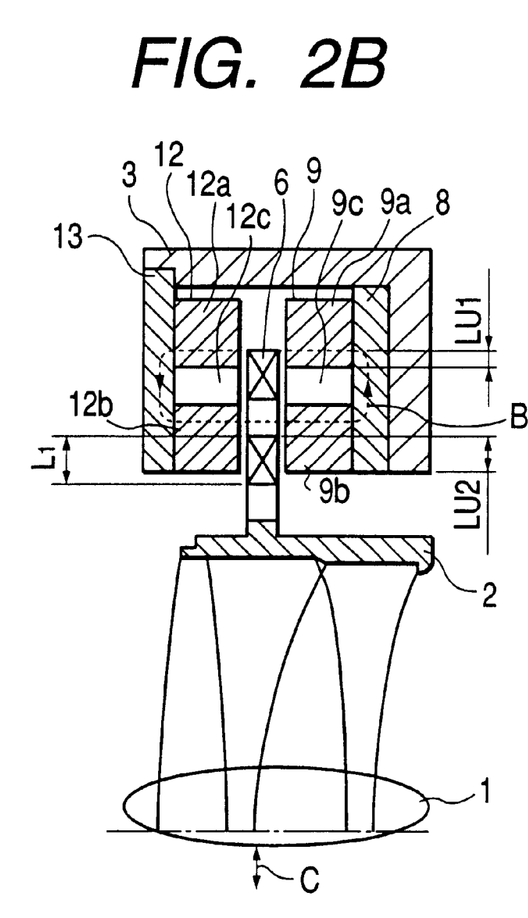

FIGS. 1, 2A and 2B show a correction optical apparatus for performing image blur correction according to one embodiment of the present invention. Specifically, FIG. 1 is an exploded perspective view of main components of the correction optical apparatus, and FIGS. 2A and 2B are sectional view for describing the operation.

First, a constitution of the correction optical apparatus according to the embodiment of the present invention will briefly be described using FIG. 1. Numeral 1 denotes a correction lens forming a correction optical system for performing image blur correction. Numeral 2 denotes a lens mirror cylinder for holding the correction lens 1, and 3 denotes a unit support frame for supporting the entire correction optical apparatus. An L-shaped support shaft 4 for regulating rotation of the lens mirror cylinder 2 around an optical axis has a portion 4a extended in the yaw direction to slidably engage with a bearing portion 2a formed on the lens mirror cylinder 2, and a portion 4b extended in the pitch direction to slidably engage a bearing portion 3a formed on the unit support frame 3. Infrared ray emitting diodes (IRED) 5a, 5b attached to the lens mirror cylinder 2 emit light rays to PSD (position semiconductor detector) 18a, 18b described later through a holed portion 2b provided on the lens mirror cylinder 2. Flat coils 6, 7 for driving the correction lens 1 in the pitch and yaw directions are integrally attached to the lens mirror cylinder 2. A first yoke 8 is integrally attached to the unit support frame 3. A first pitch driving magnet 9 is integrally attached to the first yoke 8. A first yaw driving magnet 10 is integrally attached to the first yoke 8. A second pitch driving magnet 11 is opposed to the magnet 9 via the lens mirror cylinder 2, and a second yaw driving magnet 12 is opposed to the magnet 10 via the lens mirror cylinder 2. A second yoke 13 is provided with the second pitch and yaw driving magnets 11, 12, mounted on the unit support frame 3, and integrally attached to a protrusion 3c passed through the lens mirror cylinder 2.

A backlash taking pin 14 is inserted in an insertion hole 2d formed in the lens mirror cylinder 2, abuts on an end surface of the second yoke 13 by a backlash taking spring 15 and energizes the lens mirror cylinder 2 to allow a protrusion (not shown) formed on the lens mirror cylinder 2 to abut on the first yoke 8, so that a backlash of an optical axis direction is removed. A flexible substrate 16, to which terminals of the IRED 5a, 5b and terminals of the coils 6, 7 are soldered, is electrically connected to a hard substrate 17 described later. The hard substrate 17 is fixed to the support frame 3, provided with PSD 18a, 18b and connected to the flexible substrate 16, to electrically control the image blur correction.

Numeral 19 denotes a plate for preventing short-circuit between the second yoke 13 and the hard substrate 17. To a lock ring 20 rotatably engaged with the unit support frame 3, an adsorption plate 23 is attached via a lock coil 21 and a stopper pin 22. Numeral 24 denotes a lock yoke, while 25a, 25b, 25c, 25d denote locking magnets. These lock yoke 24 and locking magnets 25 constitute a closed magnetic circuit via the lock coil 21. An adsorption coil 26 is constituted of an adsorption yoke 26a and an adsorption bobbin 26b. A return spring 27 constantly acts on the lock ring 20 in an engaging direction due to its spring properties, and has one end connected to the lock ring 20 and the other end connected to the unit support frame 3.

FIGS. 2A and 2B are sectional views showing a relationship of the magnets and coils in the correction optical apparatus constituted as described above, to describe the driving of image blur correction.

The first pitch driving magnet 9 is polarized at 9a and 9b, has a central non-magnetized neutral area 9c, and is fixed to the unit support frame 3. In the same manner as the first pitch driving magnet 9, the second pitch driving magnet 12 is polarized at 12a and 12b, has a central non-magnetized neutral area 12c, and is fixed to the unit support frame 3.

The first and second pitch driving magnets 9, 12 are integrally attached to the first and second yokes 8, 13, respectively, to constitute a closed magnetic circuit having a flow of magnetic flux as shown by an arrow B. The pitch driving coil 6 held between the opposed first and second pitch driving magnets 9 and 12 is integrally attached to the lens mirror cylinder 2 for supporting the correction optical system or correction lens 1, and further driven by supplied electricity in a direction shown by an arrow C. Additionally, FIG. 2A shows that the correction lens 1 is positioned in a driving center, and FIG. 2B shows that the correction lens 1 is driven by a maximum driving amount in the direction of the arrow C, and positioned in a driving end.

In the above-mentioned constitution, for a relationship of a winding width of the coil 6 of the driving direction and a width of the magnet 9, 12, for reasons described below, the width of the magnet 9, 12 is increased relative to the winding width of the coil, and the width of the magnet 9, 12 is set to a length obtained by adding the maximum driving amount to the winding width of the coil 6 or less.

Here, a designed/fixed space from an outer diameter of the lens mirror cylinder 2 to a maximum diameter of a driving portion is set to A, and the relationship in width of the coil 6 and the magnets 9, 12 is optimum in the predetermined space/width A, which will now be described using three constitution examples shown in FIGS. 2A and 2B to 4A and 4B.

In FIGS. 2A and 2B, a difference of the winding width of the coil 6 (hereinafter also referred to just as the coil width) and the width of the magnet 9, 12 (hereinafter referred to just as the magnet width) is shown as D. When the value is equal to or less than the maximum driving amount S, the following relationship results. The coil 6 needs to be smaller than an outer shape by the maximum driving amount S not to jut out of the maximum diameter during driving. Moreover, a coil hollow portion and a magnet neutral portion are necessary by the maximum driving amount S in such a manner that no reverse magnetic flux is applied to the coil 6 during driving. Furthermore, to prevent the magnets 9, 12 and the lens mirror cylinder 2 from colliding against one another during the driving, the maximum driving amount S is necessary between the magnets 9, 12 and the lens mirror cylinder 2. The above-mentioned relationship results in a following equation of a coil winding width $L_1$:

$$L_1=(A-3S-D)/2 \qquad (1)$$

Subsequently, when the coil 6 is positioned in the driving center as shown in FIG. 2A, a coil opposed width Lu is as follows:

$$\begin{aligned}Lu &= Lu1 + Lu2 & (2)\\ &= L_1 \times 2\\ &= A - 3S - D\end{aligned}$$

On the other hand, at the time of the maximum driving as shown in FIG. 2B the coil opposed width Lu is as follows:

$$\begin{aligned}Lu &= Lu1 + Lu2 & (3)\\ &= (A - 3S - D)/2 - S + (A - 3S - D)/2 - S + D\\ &= A - 5S\end{aligned}$$

Therefore, when the coil 6 and the magnets 9, 12 are arranged in a limited space, the following results:

From the above equation (3), the opposed width Lu of the magnets 9, 12 and coil 6 during the maximum driving is constant irrespective of D. On the other hand, since the coil width is represented with the above equation (1), a larger D attains a smaller width. Specifically, to make an evaluation only with a maximum driving end, when the difference D of the magnet width increases relative to the coil 6, an effective length of the coil through which the magnetic flux passes is unchanged, and only the entire coil length is reduced. Therefore, coil resistance is lowered, and driving efficiency is raised. However, apparent from the above equation (2), when the coil 6 is positioned in the driving center, the coil effective length is reduced with the increase of D, and the driving efficiency is dropped. Therefore, the value of D is preferably set from a balance of the driving efficiencies of the driving center and the maximum driving end. For example, for the control of vibration preventive driving, if there is a high probability that the coil 6 is driven in the vicinity of the driving center, the value of D may be reduced. Moreover, if the coil 6 is driven to the driving end with a uniform probability, the value of D may be increased.

Figure 3A:
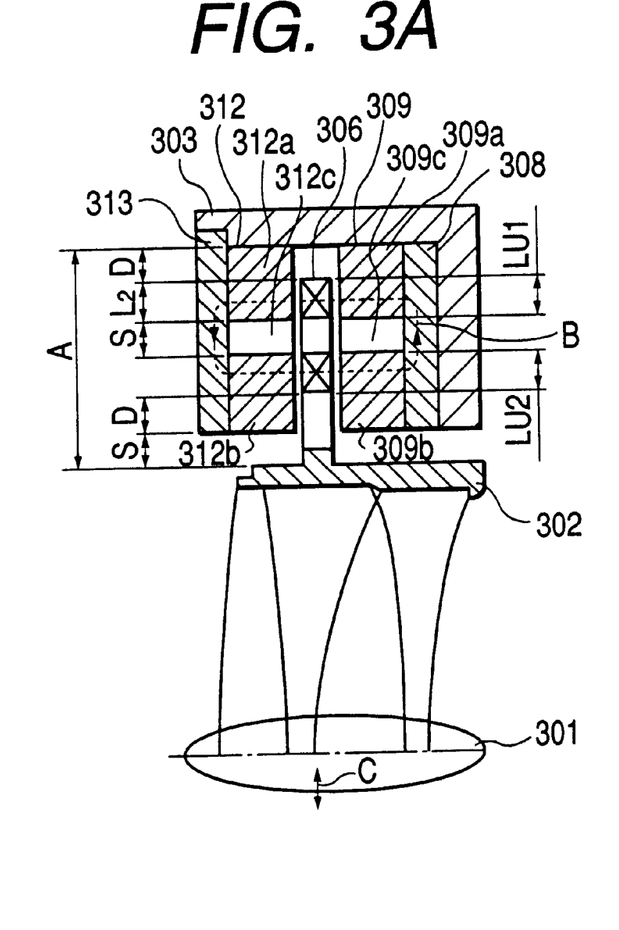
FIGS. 3A and 3B are sectional views for describing a structure of another coil and magnets illustrating an ideal structure of the coil and magnets of FIG. 2.
Figure 3B:
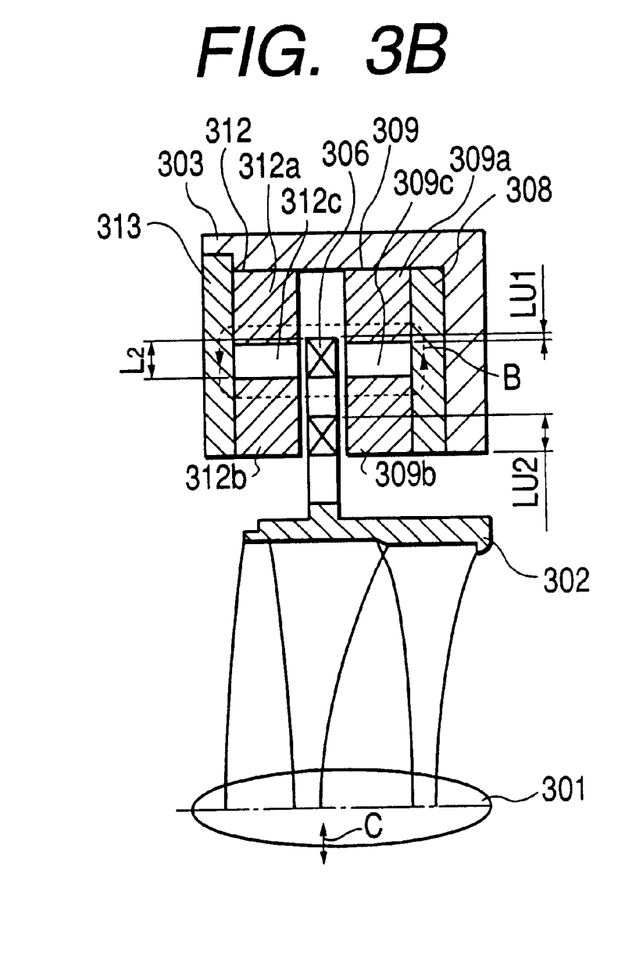

Additionally, when D is greater than the maximum driving amount S, the following relationship is obtained as shown in FIGS. 3A and 3B. In FIGS. 3A and 3B, a first pitch driving magnet 309 is polarized at 309a and 309b, has a central non-magnetized neutral area 309c, and is fixed to a unit support frame 303. In the same manner as the first pitch driving magnet 309, a second pitch driving magnet 312 is polarized at 312a and 312b, has a central non-magnetized neutral area 312c, and is fixed to the unit support frame 303.

The first and second pitch driving magnets 309, 312 are attached to first and second yokes 308, 313, respectively, to constitute a closed magnetic circuit having a flow of magnetic flux as shown by an arrow B. A pitch driving coil 306 held between the opposed first and second pitch driving magnets 309 and 312 is integrally attached to a lens mirror cylinder 302 for supporting a correction lens 301, and further driven by supplied electricity in a direction shown by an arrow C. Additionally, FIG. 3A shows that the correction lens 301 is positioned in a driving center, and FIG. 3B shows that the correction lens 301 is driven by a maximum driving amount and positioned in a driving end.

In the same manner as described above, when the difference of the coil width and magnet width is set to D, and a space from an outer diameter of the lens mirror cylinder 302 to a maximum diameter of a driving portion is set to A, the magnets 309 and 312 form a maximum outer shape, and the coil 306 becomes smaller by D than the maximum outer shape. Moreover, a coil hollow portion and a magnet neutral portion are necessary by the maximum driving amount S in such a manner that no reverse magnetic flux is applied to the coil 306 during the driving. Furthermore, to prevent the magnets 309, 312 and the lens mirror cylinder 302 from colliding against one another during the driving, the maximum driving amount S is necessary between the magnets 309, 312 and the lens mirror cylinder 302. The above-mentioned relationship results in following equation of a winding width $L_2$ of the coil 306.

$$L_2=(A-2S-2D)/2 \qquad (4)$$

Subsequently, when the coil 306 is positioned in the driving center as shown in FIG. 3A, a coil opposed width Lu is as follows:

$$\begin{aligned}Lu &= Lu1 + Lu2 & (5)\\ &= L_2 \times 2\\ &= A - 2S - 2D\end{aligned}$$

On the other hand, at the time of maximum driving as shown in FIG. 3B the coil opposed width Lu is as follows:

$$\begin{aligned}Lu &= Lu1 + Lu2 & (6)\\ &= (A - 2S - 2D)/2 - S + (A - 2S - 2D)/2\\ &= A - 3S - 2D\end{aligned}$$

Therefore, it is appreciated from the above equation (6) that as D increases, the coil opposed width Lu decreases. Moreover, from comparison of the above equations (3) and (6), D of the equation (6) is greater than S, which indicates that when D is greater than the maximum driving amount S, the coil opposed width Lu is reduced, and the driving efficiency becomes disadvantageous.

Figure 4A:
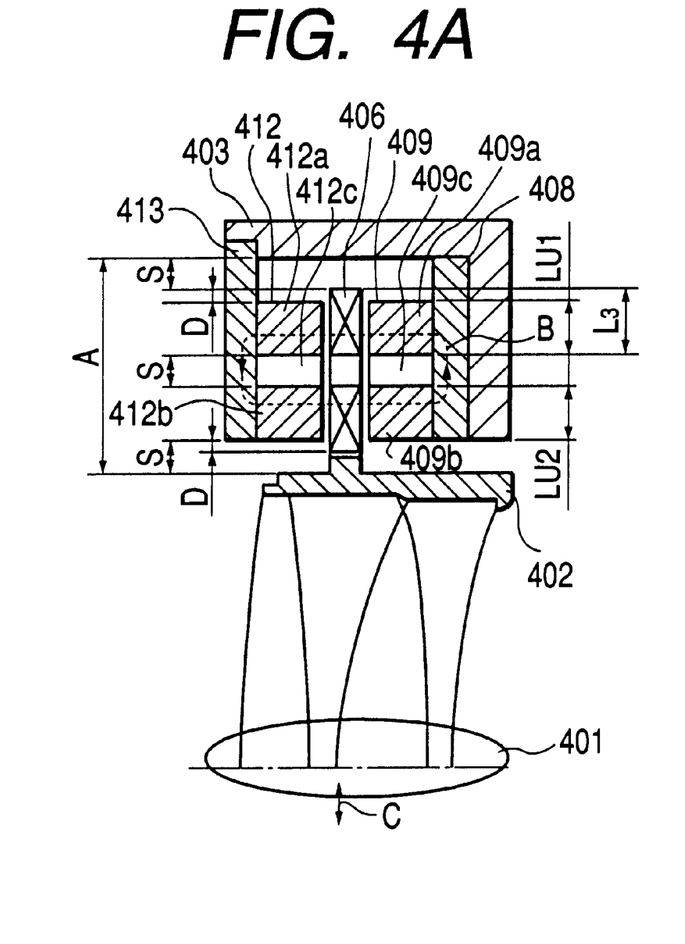
FIGS. 4A and 4B are sectional views for describing a structure of still further coil and magnets illustrating an ideal structure of the coil and magnets of FIG. 2.
Figure 4B:
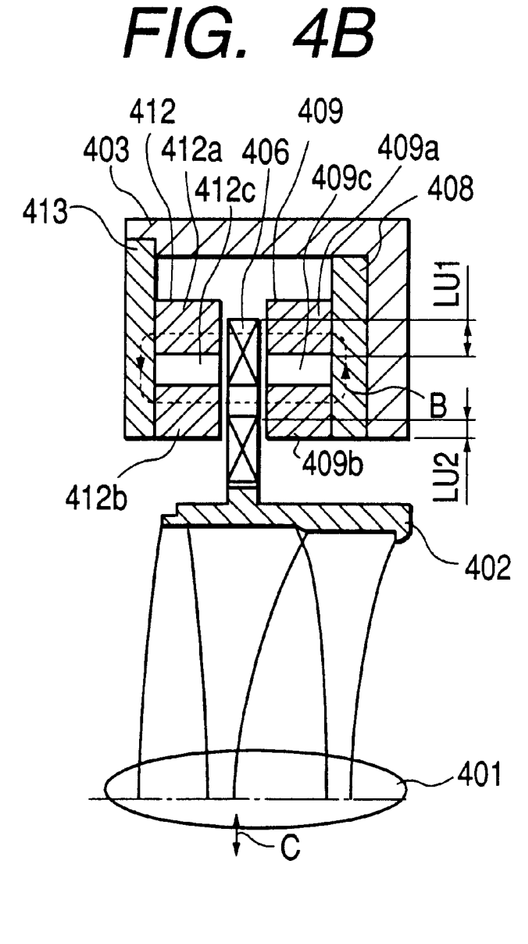

Conversely, when the coil width is greater than the magnet width only by D, a following relationship is obtained as shown in FIGS. 4A and 4B.

In FIGS. 4A and 4B, a first pitch driving magnet 409 is polarized to 409a and 409b, has a central non-magnetized neutral area 409c, and is fixed to a unit support frame 403. In the same manner as the first pitch driving magnet 409, a second pitch driving magnet 412 is polarized to 412a and 412b, has a central non-magnetized neutral area 412c, and is fixed to the unit support frame 403.

The first and second pitch driving magnets 409, 412 are attached to first and second yokes 408, 413, respectively, to constitute a closed magnetic circuit having a flow of magnetic flux as shown by an arrow B. A pitch driving coil 406 held between the opposed first and second pitch driving magnets 409 and 412 is integrally attached to a lens mirror cylinder 402 for supporting a correction lens 401, and further driven by supplied electricity in a direction shown by an arrow C. Additionally, FIG. 4A shows that the correction lens 401 is positioned in a driving center, and FIG. 4B shows that the correction lens 401 is driven by a maximum driving amount and positioned in a driving end.

In the same manner as described above, when the difference of the coil width and magnet width is set to D, and a space from an outer diameter of the lens mirror cylinder 402 to a maximum diameter of a driving portion is set to A, the coil 406 becomes smaller by S than the maximum outer shape, and the magnets 409 and 412 are further smaller by D. Moreover, a coil hollow portion and a magnet neutral portion are necessary by the maximum driving amount S in such a manner that no reverse magnetic flux is applied to the coil during driving. Furthermore, to prevent the magnets 409, 412 and the lens mirror cylinder 402 from colliding against one another during driving, the maximum driving amount S is necessary between the magnets 409, 412 and the lens mirror cylinder 402. The above-mentioned relationship results in a following equation of a winding width $L_3$ of the coil 406.

$$L_3 = (A - 3S - D)/2 + D \quad (7)$$
$$= (A - 3S + D)/2$$

Subsequently, when the coil 406 is positioned in the driving center as shown in FIG. 4A, a coil opposed width Lu is as follows:

$$Lu = Lu1 + Lu2 \quad (8)$$
$$= (L_3 - D) \times 2$$
$$= A - 3S - D$$

On the other hand, at the time of the maximum driving as shown in FIG. 4B the coil opposed width Lu is as follows:

$$Lu = Lu1 + Lu2 \quad (9)$$
$$= (A - 3S - D)/2 - S + D + (A - 3S - D)/2 - S$$
$$= A - 5S$$

Therefore, from the above equation (9), the opposed width Lu of the magnets and coil at the time of the maximum driving is constant irrespective of D. On the other hand, since the coil width is represented with the above equation (7), the winding width increases with the increase of D. Specifically, to make an evaluation only with a maximum driving end, when the difference D of the coil width relative to the magnet width increases, an effective length of the coil through which the magnetic flux passes is unchanged, and only the entire coil length is increased. Therefore, the coil resistance is raised, and the driving efficiency is lowered. Furthermore, apparent from the above equation (8), when the coil is positioned in the driving center, the coil effective length is reduced with the increase of D, and the driving efficiency drops. Therefore, as the coil is enlarged relative to the magnet, the driving efficiency becomes disadvantageous.

The above indicates that for setting of the coil and magnet widths, it is most desirable that the magnet width be greater than the coil width and that the magnet width be equal to or less than the length obtained by adding the maximum driving amount to the coil width. For this reason, in the preferred embodiment, the relationship as shown in FIGS. 2A and 2B is set.

Figure 5A:
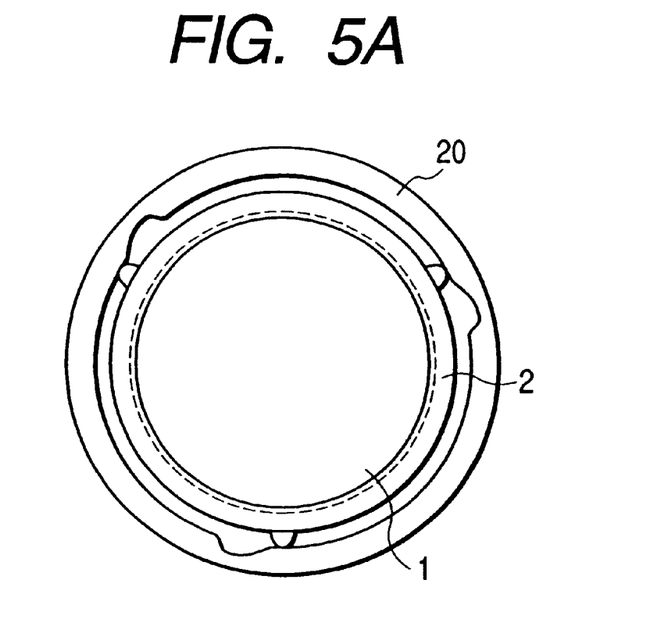
FIGS. 5A and 5B are front views for describing engagement means according to the embodiment of the present invention.
Figure 5B:
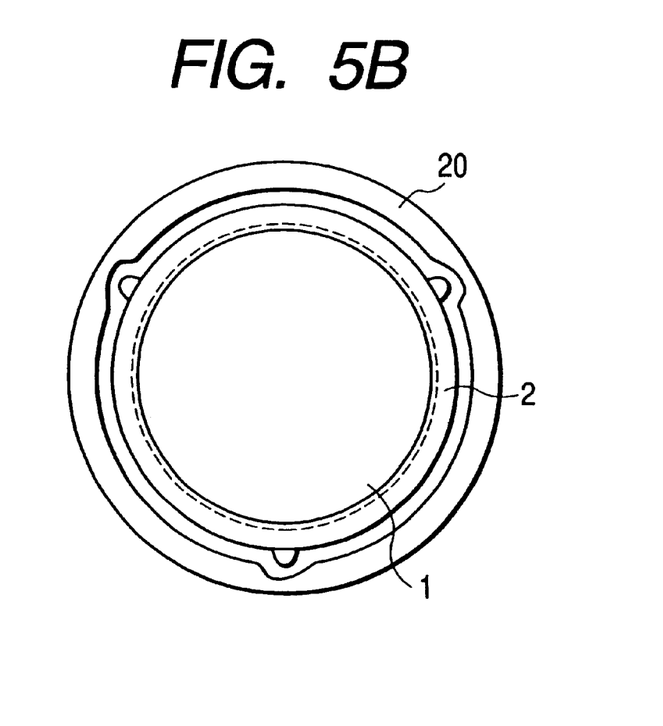

For engagement of the correction lens 1, the lock ring 20 is rotated as shown in FIGS. 5A and 5B, engaged in the state of FIG. 5A and disengaged in the state of FIG. 5B.

The driving from the engaged state to the disengaged state is performed by supplying electricity to the lock coil 21 disposed in the closed magnetic circuit formed by the locking yoke 24 and the locking magnet 25 to rotate the lock ring 20. The disengaged state of the lock ring 20 is held by supplying electricity to the adsorption coil 26 to attract the adsorption plate 23 integral with the lock ring 20. In driving the lock ring 20 from the disengaged state to the engaged state, the electric supply to the adsorption coil 26 is cut off, the lock ring 20 is rotated in an engaging direction by a return force of the return spring 27, and the lock ring 20 abuts against the stopper pin 22 so that rotation is regulated and the engaged state is held.

Figure 6:
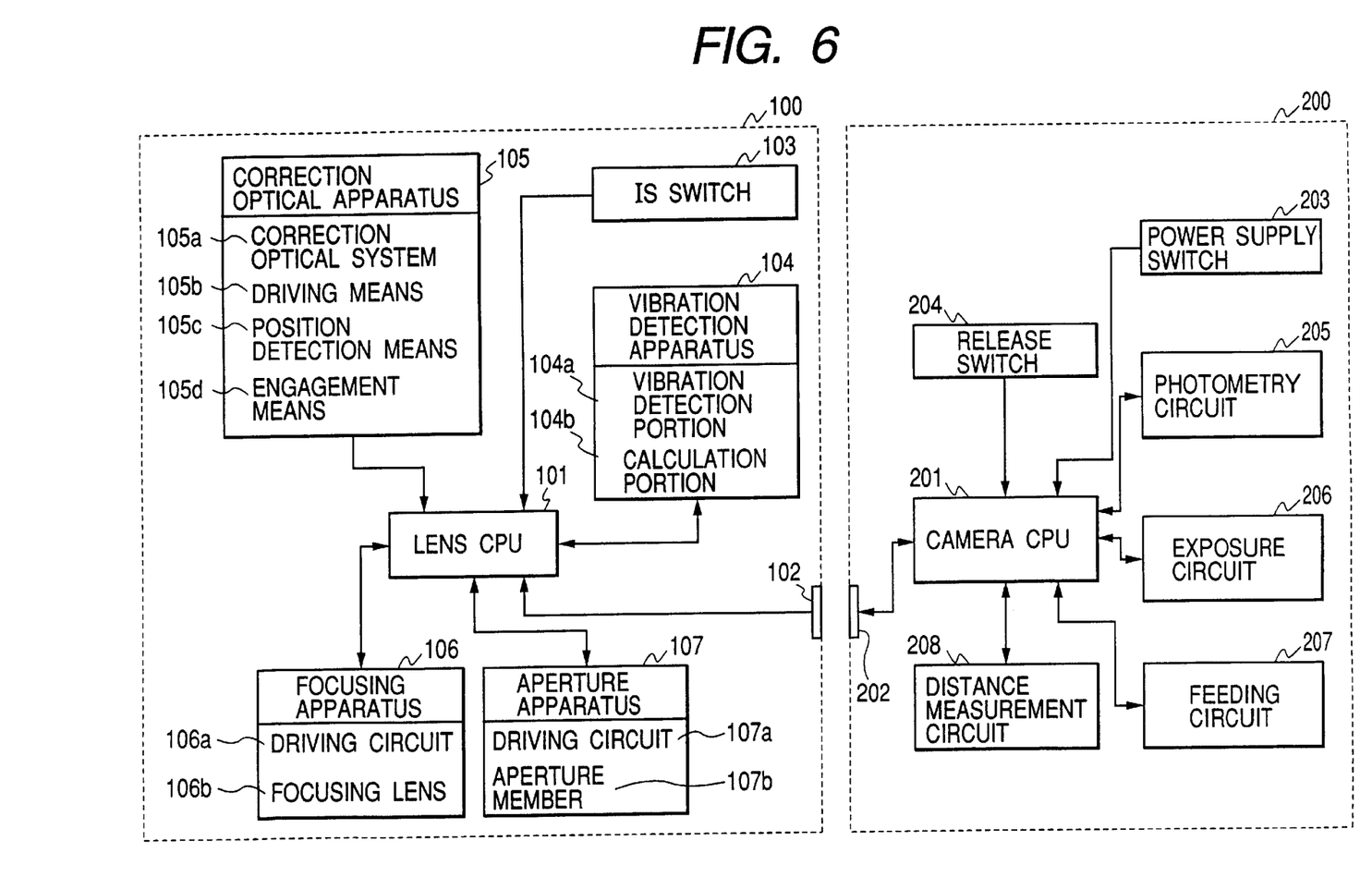
FIG. 6 is a block diagram showing a main constitution of a camera on which an image blur correction apparatus provided with the correction optical apparatus according to the embodiment of the present invention is mounted.

FIG. 6 is a block diagram showing an electric constitution of a single-lens reflex camera on which an image blur correction apparatus having the aforementioned correction optical apparatus is mounted.

In the drawing, numeral 200 denotes a camera body, and 100 denotes an exchange lens body. A camera CPU 201 is constituted of a microcomputer, as described later, to control various circuit operations in the camera body 200 and to communicate with a lens CPU 101 via a camera contact 202 when the lens body 100 is connected thereto. A power supply switch 203 can be operated from the outside to start up the camera CPU 201 so that power is supplied to actuators, sensors and the like in the system and the system gets ready for operation. A release switch 204 is of a two-step length type operable from the outside, and its signals are transmitted to the camera CPU 201.

The camera CPU 201, in response to the signal transmitted from the release switch 204, determines a luminous exposure by a photometry circuit 205, or performs focusing operation or the like to be ready for photographing when a first length switch is ON (signal SW1 is generated). When it is detected that a second length switch is ON (signal SW2 is generated), an aperture operation command is transmitted to the lens CPU 101 in the lens body 100 as described later (various apparatus operations in the lens body 100 are controlled as described later, and on the camera body 200 communication is performed with the camera CPU 201 via a lens contact 102). Additionally, an exposure start command is transmitted to an exposure circuit 206 to perform an actual exposure operation. Upon reception of an exposure end signal, a feeding start command is transmitted to a feeding circuit 207 to wind up a film. In a distance measurement circuit 208, when the first length switch of the release switch 204 is turned on (signal SW1 is generated), in response to a distance measurement start command transmitted from the camera CPU 201, a distance of an object present in a distance measurement area is measured, and a movement amount of a focusing lens necessary to focus on the object is determined and transmitted to the camera CPU 201.

An image blur correcting switch 103 (hereinafter referred to as IS switch) operable from the outside can select whether an image blur correcting operation (hereinafter referred to as IS operation) is performed, as described later (select IS operation when ON). A vibration detection apparatus 104 is constituted of a vibration detection portion 104a for detecting acceleration, speed and the like of camera vertical and transverse vibrations in response to a command from the lens CPU 101, and a calculation portion 104*b* for transmitting to the lens CPU 101 a displacement obtained by electrically or mechanically integrating output signals of the vibration detection portion 104*a*.

A correction optical apparatus 105 described in detail with reference to FIGS. 1 and 2 is largely classified into four components controlled by the lens CPU 101: first a correction optical system 105*a* mainly comprising the correction lens 1; secondly driving means 105*b* comprising the magnets 9, 10, 12, 13, and coils 6, 7 for driving the correction optical system 105*a* in the pitch and yaw directions; thirdly position detection means 105*c* mainly comprising IRED and PSD; and fourthly engagement means 105*d*, to hold the engaged state of the correction optical system 105*a*, comprising the locking yoke 24, locking magnet 25 and lock coil 21 for rotating the lock ring 20 so as to drive it from the engaged state to the disengaged state, and the adsorption coil 26 for holding the disengaged state of the lock ring 20.

Additionally, the correction optical apparatus 105, IS switch 103, vibration detection apparatus 104, and the lens CPU 101 for controlling these components constitute the image blur correction apparatus.

A focusing apparatus 106 is constituted of a driving circuit 106*a* controlled by the lens CPU 101 in accordance with the focusing lens movement amount transmitted from the camera CPU 201 as described above, and a focusing lens 106*b* driven by the driving circuit 106*a*. An aperture apparatus 107 is constituted of a driving circuit 107*a* controlled by the lens CPU 101 in accordance with the aperture operation command transmitted from the camera CPU 201 as described above, and an aperture member 107*b* driven by the driving circuit 107*a* to determine an aperture area.

Figure 7:
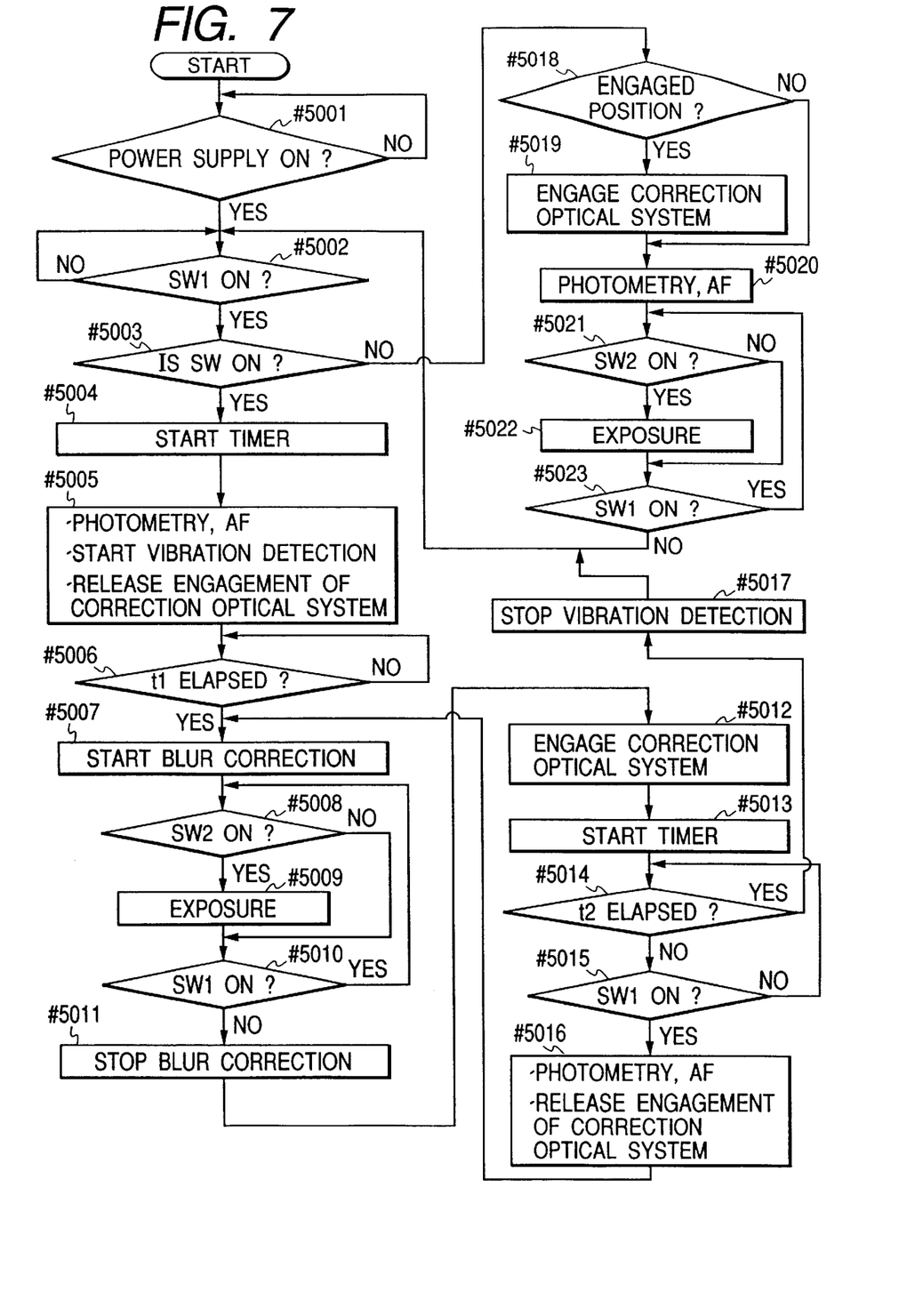
FIG. 7 is a flowchart showing a series of operations of the camera of FIG. 6.

FIG. 7 is a flowchart showing a main operation of the aforementioned camera.

First, the power supply switch 203 of the camera body 200 is turned on, and it is judged that the power supply to the lens body 100 is started (or that a new battery is loaded, the lens body 100 is mounted on the camera body 200 or communication is started otherwise between the camera body 200 and the lens body 100) (YES at #5001). Subsequently, the camera CPU 201 judges whether or not signal SW1 is generated in the release switch 204 (#5002). As a result, when the signal is generated, the lens CPU 101 in turn judges whether the IS switch 103 is ON (IS operation is selected) (#5003). When IS operation is selected, the process advances to step #5004. When it is not selected, the process advances to step #5018. At the step #5004, the lens CPU 101 starts its inner timer. Subsequently, in order that the camera CPU 201 can perform photometry, or AF (distance measurement operation), the lens CPU 101 can perform AF (focusing operation), or start vibration detection, and that the driving means 105*b* can control the blur correction, electricity is supplied to the lock coil 21 disposed in the closed magnetic circuit formed by the locking yoke 24 and locking magnet 25, and the lock ring 20 is rotated and disengaged (i.e., the engagement of the engagement means 105*d* is released). Additionally, electricity is supplied to the adsorption coil 26 to attract the adsorption plate 23 integral with the lock ring 20 so that the released state of the lock ring 20 is held (#5005).

Subsequently, for a timing content of the timer the lens CPU 101 checks whether or not a predetermined time $t_1$ has elapsed. If it has not elapsed, the process stays in this step until it elapses (#5006). This is a processing for being on standby for a time until an output of the vibration detection apparatus 104 is stabilized. Thereafter, when the predetermined time $t_1$ elapses, based on a target value signal by the output of the vibration detection apparatus 104 and an output of the position detection means 105*c*, the correction optical system 105*a* is driven via the driving means 105*b*, thereby starting a blur correction control (#5007).

Subsequently, the camera CPU 201 checks whether or not signal SW2 is generated in the release switch 204 (#5008). If the signal is not generated, it is again judged whether or not the signal SW1 is generated (#5010). If the signal SW1 is not generated either, the lens CPU 101 stops the blur correction control (#5011). Additionally, the correction optical system 105*a* is engaged in a predetermined position (optical axis center position) by the engagement means 105*d* (#5012).

Moreover, when it is judged that the signal SW2 is not generated at the step #5008, but the signal SW1 is generated at the step #5010, the process returns to step #5008. Subsequently, when it is judged at the step #5008 that the signal SW2 of the release switch 204 is generated, the lens CPU 101 controls the aperture apparatus 107, and the camera CPU 201 simultaneously performs an operation of exposure to the film via the exposure circuit 206 (#5009). Subsequently, the camera CPU 201 checks the state of the signal SW1 (#5010). When the signal SW1 is not generated any more, the lens CPU 101 stops the blur correction control (#5011). Additionally, the correction optical system 105*a* is engaged in the predetermined position (optical axis center position) by the engagement means 105*d* (#5012). Specifically, in driving the lock ring 20 from the disengaged state to the engaged state, the electric supply to the adsorption coil 26 is cut off, the lock ring 20 is then rotated in the engaging direction by the return force of the return spring 27, and the lock ring 20 abuts against the stopper pin 22 so that rotation is regulated and the engaged state is held.

After the above-mentioned operation is finished, the lens CPU 101 once resets the timer to restart (#5013), and again judges whether the signal SW1 is generated within a predetermined time $t_2$ (#5014→#5015→#5014 . . . ). If the signal SW1 is again generated within the predetermined time $t_2$ after the blur correction is stopped, the photometry, AF (distance measurement operation and focusing operation) and release of the engagement of the correction optical system 105*a* are performed (#5016). Since vibration detection is continued, the correction optical system 105*a* is immediately driven based on the target value signal and the output of the position detection means 105*c*, thereby restarting the blur correction control (#5007).

The aforementioned operation is then repeated. Such processing can obviate the aforementioned disadvantage that every time a photographer stops a release operation before again performing the release operation, the vibration detection apparatus 104 is started and the process is on standby until the output is stabilized.

On the other hand, when the signal SW1 is not generated within the predetermined time $t_2$ after the blur correction is stopped (#5015→#5014 YES), vibration detection is stopped (the operation of the vibration detection apparatus 104 is stopped) (#5017). The process then returns to the step #5002, and is on standby until the signal SW1 is generated.

When the IS operation is not selected at step #5003, the process advances to step #5018 to detect the position of the correction optical system 105*a* by the position detection means 105*c*. When it is judged that the correction optical system 105*a* is in the engaged position, the process advances to step #5020. When it is judged that the system is not in the engaged position, the process advances to step #5019 to drive the correction optical system 105*a* to the engaged position. Specifically, the correction optical system 105*a* is engaged by engaging the backlash taking pin 14 in the engagement groove formed in the second yoke.

At the next step #5020, the camera CPU 201 performs the photometry and AF (distance measurement operation), while the lens CPU 101 performs AF (focusing operation). Subsequently, the camera CPU 201 checks whether or not the signal SW2 of the release switch 204 is generated (#5021). If it is not generated, it is again judged whether or not the signal SW1 is generated (#5023). If the signal SW1 is not generated either, the process returns to the step #5002 to be on standby until the signal SW1 is generated. Moreover, when at step #5023 the signal SW2 is not generated but the signal SW1 is generated, the process returns to the step #5021. Subsequently, when it is detected at the step #5021 that the signal SW2 is generated in the release switch 204, the lens CPU 101 controls the aperture apparatus 107, and the camera CPU 201 simultaneously performs the operation for exposure to the film via the exposure circuit 206 (#5022). Subsequently, the camera CPU 201 checks the state of the signal SW1 (#5023). If the signal SW1 is not generated, the process returns to the step #5002 from the step #5022.

In a single-lens reflex camera of the lens exchange type according to this embodiment, the series of operations is repeated until the power supply switch 203 is turned off. When it is turned off, the communication of the camera CPU 201 and lens CPU 101 is ended, thereby ending the power supply to the lens body 100. Additionally, in the above-mentioned sequence, when it is judged that the IS switch 103 is OFF (image blur correction is OFF), the position of the correction optical system 105*a* is constantly detected (step #5018). Therefore, when the engaged state is inadvertently deviated, driving is reliably performed to the engaged state (step #5019), so that a countermeasure against the deviation at the time of impact is devised.

According to the above-mentioned embodiment, in the correction optical apparatus for driving the correction lens 1 to correct image blur, having the driving means comprising the flat coils 6, 7 and the opposed magnets 9 to 12 to drive the correction lens 1 for correcting image blur, for the relationship of the width of the driving direction of the coil 6, 7 and the width of the magnet 9 to 12, the width of the magnet 9 to 12 is set greater than the width of the coil 6, 7, and additionally the width of the magnet 9 to 12 is set equal to or less than the length obtained by adding the maximum driving amount of the correction lens 1 to the width of the coil 6, 7. Therefore, even when the driving amount of the correction lens is large, the opposed width of the coils and magnets fails to be remarkably reduced. Therefore, deterioration of the driving efficiency can be minimized, and the driving means can be prevented from being enlarged, so that the apparatus space efficiency can be optimized.

The relationship of the above-mentioned embodiments and the present invention has been described, but the present invention is not limited to the constitutions of these embodiments and, needless to say, any constitution can be used as long as functions mentioned in claims, or functions of the embodiments can be attained.

(Modification)

Although the examples in which the present invention is applied to the camera have been described, it is not limited to the examples, and the present invention can be applied to an apparatus provided with the correction optical apparatus or another apparatus required to be prevented from vibration, and further to a driving apparatus for reciprocating a moving member in a predetermined direction.

As described above, according to the embodiment of the present invention, there can be provided a driving apparatus in which even when the driving amount of the moving member is large, deterioration of the driving efficiency can be minimized without enlarging the driving apparatus.

Moreover, according to the present invention, there can be provided a correction optical apparatus and image blur correction apparatus in which even when the driving amount of the correction optical system is large, deterioration of the driving efficiency can be minimized without enlarging the driving means and in which space efficiency can be optimized.

What is claimed is:

1. An image blur correction apparatus comprising:
   a movable portion movable to correct image blur; and
   a driving device that drives the movable portion to correct image blur, the driving device comprising a coil integrally provided on said movable portion, and a magnet disposed opposite the coil,
   wherein a width of said magnet in a driving direction of said coil is greater than a width of said coil in the driving direction, and smaller than a length obtained by adding to the width of said coil a movement length of said coil corresponding to a maximum driving length of said movable portion in the driving direction.

2. The apparatus according to claim 1, wherein said coil is wound around an axis perpendicular to the driving direction.

3. The apparatus according to claim 1, wherein said coil has a flat shape in a direction perpendicular to the driving direction.

4. The apparatus according to claim 1, wherein said magnet is provided on opposite sides of said coil.

5. The apparatus according to claim 1, wherein said coil comprises a first coil portion and a second coil portion each arranged along the driving direction, and said magnet comprises a first magnet portion opposing said first coil portion and a second magnet portion opposing said second coil portion arranged along the driving direction.

6. The apparatus according to claim 5, wherein an interval of said first coil portion and said second coil portion is equal to an interval of said first magnet portion and said second magnet portion.

7. The apparatus according to claim 5, wherein a length of said coil in the driving direction is set in such a manner that said first coil portion fails to reach a position opposite said second magnet portion.

8. The apparatus according to claim 1, wherein said coil includes means arranged and fixed in said driving direction relative to said movable portion.

9. The apparatus according to claim 1, wherein said movable portion includes an optical member.

10. The apparatus according to claim 9, wherein said coil includes means fixed to said movable portion in such a manner that the coil fails to overlap the optical member for an optical axis direction of said optical member of said movable portion.

11. The apparatus according to claim 10, wherein said coil includes means fixed to said movable portion in a peripheral position of a diameter direction of said optical member of said movable portion.

12. The apparatus according to claim 1, wherein said driving device includes means for supplying power to said coil.

13. The apparatus according to claim 12, wherein said driving device includes means for supplying power to said coil in response to a signal corresponding to a vibration of the apparatus.

14. The apparatus according to claim 1, wherein said image blur correction apparatus includes means for optically correcting image blur.

15. The apparatus according to claim 14, wherein said image blur correction apparatus includes means for deflecting a luminous flux to correct image blur.

16. The apparatus according to claim 14, wherein said image blur correction apparatus includes means for operating in a direction perpendicular to an optical axis to correct image blur.

17. The apparatus according to claim 14, wherein said image blur correction apparatus includes means for acting on a photographing ray of a camera to correct image blur.

18. An optical apparatus having an image blur correction function comprising:

a movable portion movable to correct image blur; and a driving device that drives the movable portion to correct image blur, the driving device comprising a coil integrally provided on said movable portion, and a magnet disposed opposite the coil, wherein a width of said magnet in a driving direction of said coil is greater than a width of said coil in the driving direction of said coil, and smaller than a length obtained by adding to the width of said coil a movement length of said coil corresponding to a maximum driving length of said movable portion in the driving direction.

19. The apparatus according to claim 18, wherein said optical apparatus is a camera system.

20. The apparatus according to claim 18, wherein said optical apparatus is a lens apparatus detachably attached to a camera.

21. An optical apparatus having an image blur correction function comprising:

a photo taking optical system;

a movable portion that supports a lens disposed within the photo taking optical system so as to correct image blur; and a driving device that drives the movable portion to correct image blur, the driving device comprising a coil integrally provided on said movable portion, and a magnet disposed opposite said coil, wherein a width of said magnet in a driving direction of said coil is greater than a width of said coil in the driving direction, and smaller than a length obtained by adding to the width of said coil a movement length of said coil corresponding to a maximum driving length of said movable portion in the driving direction.

22. An apparatus according to claim 21, wherein said optical apparatus is a camera system.

23. An apparatus according to claim 21, wherein said optical apparatus is an interchangeable lens.

24. An optical apparatus having an image blur correction function comprising:

a vibration detection means that detects a vibration of said optical apparatus;

control means that controls the image blur correction function on the basis of an output from said vibration detection means;

a movable portion that supports an image blur correction lens for correcting image blur in accordance with an output of said control means; and a driving device that drives the movable portion to correct image blur, the driving device comprising a coil integrally provided on said movable portion, and a magnet disposed opposite said coil, wherein a width of said magnet in a driving direction of said coil is greater than a width of said coil in the driving direction, and smaller than a length obtained by adding to the width of said coil a movement length of said coil corresponding to a maximum driving length of said movable portion in the driving direction.

25. An apparatus according to claim 24, wherein said optical apparatus is a camera system.

26. An apparatus according to claim 24, wherein said optical apparatus is an interchangeable lens.

* * * * *